United States Patent [19]

Holland

[11] 4,262,653
[45] Apr. 21, 1981

[54] SOLAR ENERGY HEAT STORAGE AND TRANSFER SYSTEM

[75] Inventor: Larry D. Holland, Dallas, Tex.

[73] Assignee: Neha International, Dallas, Tex.

[21] Appl. No.: 34,987

[22] Filed: May 1, 1979

[51] Int. Cl.³ .................................................. F24J 3/02
[52] U.S. Cl. ..................................... 126/400; 126/430; 126/436; 126/437
[58] Field of Search ............... 126/400, 430, 436, 437; 165/18

[56] References Cited

U.S. PATENT DOCUMENTS

| | | | |
|---|---|---|---|
| 3,060,870 | 10/1962 | Hexdall | 126/400 |
| 3,996,919 | 12/1976 | Hepp | 126/400 |
| 4,063,546 | 12/1977 | Schmid | 126/400 |
| 4,073,284 | 2/1978 | Laing | 126/400 |
| 4,094,302 | 6/1978 | Rohr | 126/400 |
| 4,099,558 | 7/1978 | Bricard et al. | 126/400 |
| 4,104,185 | 8/1978 | Schröder | 126/400 |
| 4,111,185 | 9/1978 | Swann | 126/400 |
| 4,121,563 | 10/1978 | Gold | 126/400 |
| 4,154,292 | 5/1979 | Herrick | 126/400 |
| 4,170,261 | 10/1979 | Laing et al. | 126/400 |

Primary Examiner—Daniel J. O'Connor
Attorney, Agent, or Firm—Dennis T. Griggs

[57] ABSTRACT

A solar energy heat storage and transfer system (30) for use in a solar heating system includes an arrangement of interconnected heat storage modules (10). A first air path is provided from the solar collector through an inlet manifold (52) to the interior of each of the heat storage modules (10) to transfer the heat through the air passageways through a plurality of heat storage tubes (12). The first air path is completed by the return of the air to the solar collector from the heat storage modules (10) through an exhaust air manifold (54). A second air path is provided by a housing (32) surrounding the arrangement of heat storage modules (10) and connected to the distribution network of the heating system. An air inlet (34) allows air from the interior of a building to enter the bottom of the housing (32) and flow around an exterior conductive sheet (20) around each heat storage module (10) and through the outlet (36) to the remainder of the air distribution network of the system.

7 Claims, 4 Drawing Figures

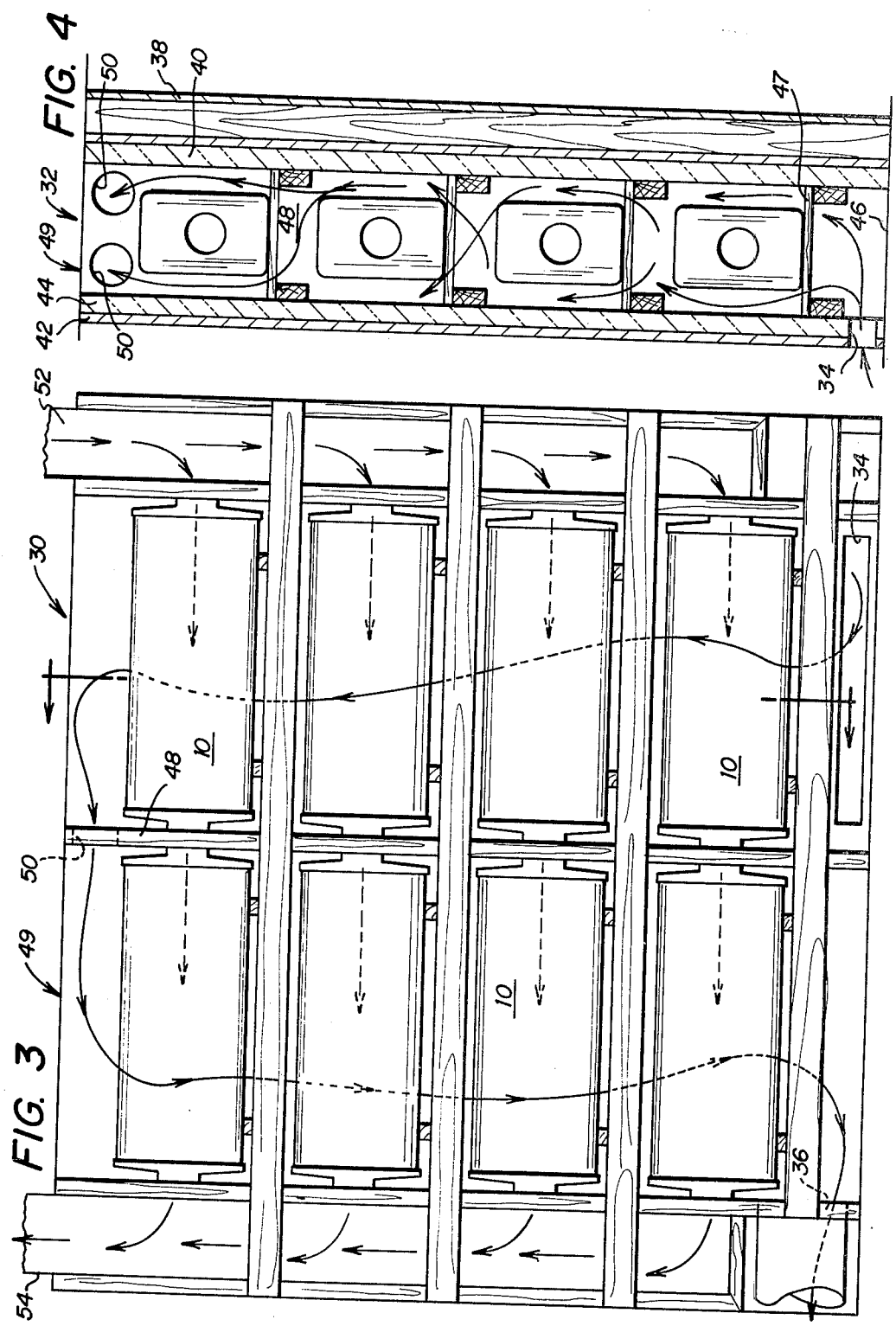

SOLAR ENERGY HEAT STORAGE AND TRANSFER SYSTEM

TECHNICAL FIELD

This invention relates to solar energy air conditioning systems for buildings, and more particularly to a system for storing the heat energy from a solar collector and transferring that stored heat energy to the interior of a structure through its air conditioning system.

BACKGROUND OF THE INVENTION

The depletion and interruption of the delivery of fossil fuel supplies have focused much attention on the harnessing of solar energy as an inexhaustible source of clean energy for the future. In many regions of the country, solar energy has long been recognized as an available energy source for heating a building, but such systems have met with some resistance, mostly because of the physical space required by such systems and their cost comparisons with existing technology. Important factors in the size and cost limitations of a solar energy air conditioning system have been both the heat storage component and the air handler component of the system. These factors have contributed to the problem of retrofitting an existing structure with a solar energy system.

The existing solar energy air conditioning systems include an arrangement of heat storage components for receiving and storing heat energy from the solar collectors. Heat absorbed by the collectors during the peak daylight hours must then be stored in the system for use at a later time to provide a continuous source of heat to the interior of the building. Such systems also include an air handler having associated controls to mix the correct volume of air from the heat storage unit with the correct volume of air from the interior of the building. The air handler mixes the desired percentage of air from the collector with the desired percentage of air from the inside of the building and determines how much air goes back to the collectors and how much goes into the building. A need has thus arisen for an improved solar energy air conditioning system which improves the storage of heat from the solar collectors, the transfer of heat from the storage to the interior of the building, and simplifies the flow of heated air into the building.

SUMMARY OF THE INVENTION

In accordance with a preferred embodiment, a solar energy heating system is provided with an arrangement of heat storage modules, such that two separate air paths are defined to eliminate the need for the solar air handler with its associated controls. The heat storage modules include a plurality of closed tubes containing a heat of fusion material for heat storage, such as a salt-hydrate mixture or phase change material. The salt-hydrate or phase change material tubes are situated on a vertical array of support trays and enclosed within a wrap of heat conductive material so as to define an air path through the heat storage module. End pieces are fitted over the container to connect the heat storage module to ductwork from the solar collector as well as to any desired number of additional heat storage modules to achieve the required thermal storage capacity. A plurality of the heat storage modules may then be surrounded by a housing with suitable partitions to define a second path of air to flow from the interior of the building around the exterior of each of the heat storage modules and returned to the interior of the building through the system's air conditioning ducts. Thus, the temperature of the interior of the building may be adjusted by bringing in the cooler air from the interior of the building, circulating it around the exterior of the heat storage modules, and returning it to the building.

Another advantage to the system is that the arrangement of heat storage modules may be vertically stacked between the exterior and interior walls of a building, placing them near the solar collectors, normally on the roof of the structure, without wasting the usable interior space of the building. The compact modular heat storage devices enable a heat storage system to be used without an air handler which makes the system ideally suited for retrofitting an existing structure with a solar energy heating system. The solar energy heat storage and transfer system of the present invention is adaptable for use in other structures, such as recreational vehicles and mobile homes where space limitations constrain full utilization of prior solar energy systems as a source of heat.

A better understanding of the invention and its advantages can be seen in the following description of the figures and the preferred embodiment.

DESCRIPTION OF THE PREFERRED EMBODIMENT

FIG. 3 is a side view of one arrangement of heat storage elements in a heat storage and transfer system having two separate air paths for storing and transferring the solar energy.

FIG. 4 is a view of the heat storage and transfer system taken along the line 4—4 of FIG. 3.

Figure 1:
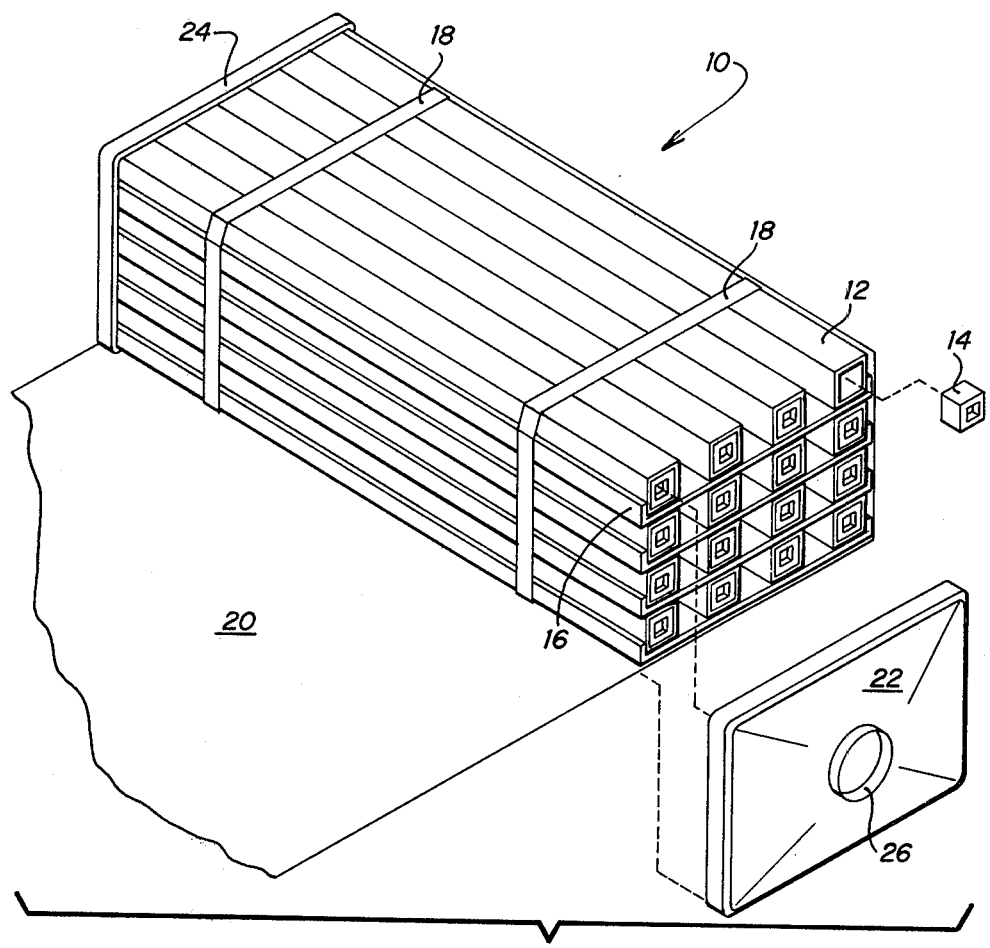
FIG. 1 is a perspective view of a heat storage unit with the end cover removed and the heat conductive exterior wrap partially removed to show the arrangement of salt tubes.

A heat storage module 10 is illustrated in FIG. 1, partially disassembled to reveal the interior of the unit. A plurality of elongated tubes 12 sealed by end covers 14 contain the heat of fusion material for storing the thermal energy collected by the solar collectors (not shown). The number of tubes 12 in an array may be arranged to meet the desired heat storage capacity of the module 10. The tubes 12 and end covers 14 are preferably constructed of a durable lightweight ABS plastic.

There are a number of heat of fusion materials which are used for storing thermal energy because of their low cost and high heat of fusion per unit weight. Among the acceptable phase change materials for a thermal energy storage medium are salt-hydrates and their eutectics. One such phase change material which may be used for storing thermal heat by virtue of the heat of fusion which is released when changing from a liquid to a solid is sodium sulfate decahydrate ($Na_2SO_4.10H_2O$). Such materials are usually placed in sealed containers together with a nucleating agent to initiate and promote the formation of crystals necessary to make use of the heat of fusion of the material, as well as a gelling agent to prolong the useful life of the mixture. (The need and use of such nucleating and gelling agents is discussed in U.S. Pat. No. 2,677,664 and U.S. Pat. No. 3,986,969).

Figure 2:
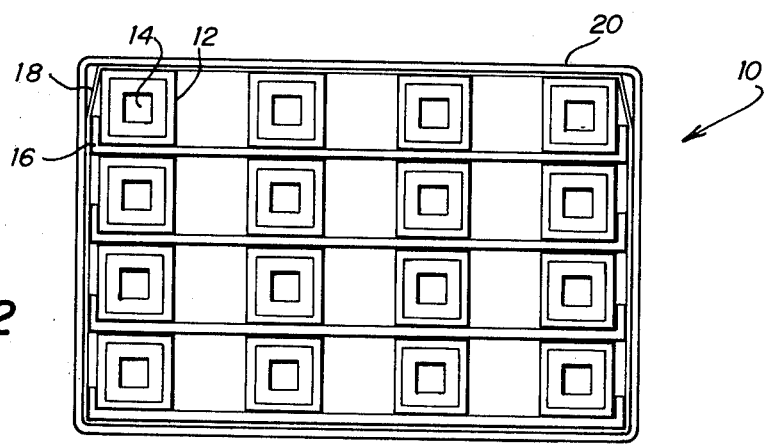
FIG. 2 is an end view of the solar energy unit of FIG. 1 with the end cover removed.

The sealed tubes 12 are arranged and supported upon trays 16 as illustrated in FIGS. 1 and 2, such that a sufficient air space is provided between adjacent tubes 12 to provide a passageway for heated air flowing into the heat storage module 10 from the solar collector. The support trays 16 are preferably formed from a highly heat conductive material, such as aluminum, for the more efficient transfer of heat from the surface of the salt-hydrate tube 12 to the exterior of the heat storage module 10. Similarly, the tubes 12 are preferably rectangular in cross-sectional area to provide maximum surface contact with the trays 16. The support trays 16 are vertically stacked upon one another so that the bottom of one support tray 16 rests upon the upper surface of the eutectic salt-hydrate tubes 12 directly beneath it. This arrangement maximizes thermal contact with the salt-hydrate tubes 12 and promotes the transfer of heat from each of the tubes 12 to the exterior of the heat storage module 10. The heat storage module 10 shown discloses a four by four array of salt-hydrate tubes 12 but, of course, the number and configuration of tubes 12 and support trays 16 may vary to meet the necessary design configurations of the system.

A pair of straps 18 surround the vertically stacked support trays 16 to maintain them in the desired configuration. Of course, for some configurations of tubes 12 of a module 10 it may be desirable to also include some lateral spacing device which could be integrally formed with the tray 16. A sheet of heat conductive material 20 is wrapped around the sides of the bundle of salt-hydrate tubes 12 and vertically stacked support trays 16 to thereby define an air passageway through the heat storage module 10 along the length of all the elongated tubes 12. The heat conductive sheet 20 thus allows the heated air from the solar collector to flow along the entire length of the salt-hydrate tubes 12 for transferring its heat to the storage medium. The heat conductive sheet 20 also acts to conduct heat from the tubes 12 within the heat storage module 10 to air flowing around the exterior skin of the heat conductive sheet 20, as shown in FIGS. 3 and 4 and discussed more fully hereinbelow.

Heat storage module end covers 22 and 24 are fitted over the open ends of the heat storage module 10 to complete the unit. The module end covers 22 and 24 may be constructed of relatively inexpensive and lightweight ABS plastic, and each of the end covers 22 and 24 have a central opening 26 for connecting the path of air within the heat storage module 10 with the necessary ductwork connected to the solar collector system (not shown).

FIGS. 3 and 4 illustrate an array of the heat storage modules 10 included in a solar energy heat storage and transfer system 30. The heat storage and transfer system 30 includes an interconnected array of heat storage modules 10 to define a first path of air from the solar collector air system through said heat storage units returning to the solar collector air system. Further, the interconnected heat storage modules 10 are positioned within a housing 32 to define a second path of air flow for the air from the interior of the structure. The air from the structure flows into an inlet 34 and across the exterior surface of the heat storage modules 10, returning to the interior of the structure through an outlet 36 through the air conditioning ducts of the structure.

As illustrated in FIG. 4, the housing 32 is formed between an exterior wall 38 of the structure with its layer of insulation 40, and an interior wall 42 with its layer of insulation 44. A bottom surface 46, which may be the floor of the structure, and a top surface 49, which may be the ceiling of the structure, complete the housing 32 for defining the second flow path for air from the interior of the building to be warmed by flowing around the heat storage modules 10.

Of course, while the housing 32 has been illustrated and described as being formed between the exterior and interior walls of a structure, it is to be understood that the housing 32 may also be situated between the interior walls of a structure, or it may be a structure separate from the walls of the air conditioned structure.

In the particular arrangement of each heat storage module 10 illustrated in FIG. 3, the heat storage modules 10 are connected in tandem pairs and are vertically stacked within the housing 32 and supported upon a platform 47 to allow the cooler room air to flow around the warmer heat storage modules 10. A center partition 48 is provided between the connected pairs of heat storage modules 10 to force the air from inlet 34 to travel by convection around each of the heat storage modules 10 on one side of the transfer system 30. A parir of ports 50 are formed in the partition 48 above the top level of heat storage modules 10 which direct the air to flow down and around the other side of the vertical stack of heat storage modules 10. The air is drawn around the heat storage modules 10 on the opposite side of the heat storage and transfer system 30 of FIG. 3 and through the outlet 36 by a draft created by a fan controlled by the air conditioning system's thermostat (not shown).

An air inlet manifold 52 provides a passageway for the heated air from the solar collectors through the central openings 26 that lead to each of the tandem pairs of heat storage modules 10. The heated collector air travels through the center of the heat storage modules 10 on one side and through the second interconnected heat storage modules 10 on the other side. The collector air exits the housing 32 through an exhaust air manifold 54 and returns to the collector air system connected to the solar collector.

The heat storage module 10 illustrated in the heat storage and transfer system 30 uses sodium sulfate decahydrate ($Na_2SO_4.H_2O$) as the salt-hydrate mixture for thermal energy storage. The volumetric heat of fusion of such a mixture, including thickening agents and nucleating agents, as disclosed in U.S. Pat. No. 3,986,969, is 9,800 BTU/feet$^3$. In one particular embodiment, each tube 12 has a volume of 0.039 cubic feet, providing it with the heat capacity due to the heat of fusion of the euctectic salt of 382 BTU. Further, the latent heat capacity of such a euctectic salt mixture is 0.79 BTU/(pounds) (°F.). Given that the particular euctectic salt tube weighs 3.55 pounds and the heat storage system operates between 90° and 100° F., the stored latent heat in each tube is 84.0 BTU, or the total heat stored per tube equals 466 BTU. The necessary heat storage capacity for a heat storage and transfer system 30 can be obtained by selecting the desired number of euctectic salt tubes 12 and the desired number of heat storage modules 10.

In operation, in a single family residence for example, a solar collector could be positioned on the roof of the structure to absorb the solar energy, with appropriate ductwork transfering the heated air from the collector through the inlet manifold 52 to the tandemly connected pairs of heat storage modules 10, with the collector air exiting from the exhaust manifold 54 to complete the flow path circuit back to the solar collector. The energy from the sun is stored in the salt-hydrate tubes 12 of the heat storage module 10 during daylight hours for transfer to the interior of the structure through a second air flow path. When the air within the interior of the building drops below a preferred setting, a thermostat may control a blower (not shown) to create a draft of the interior air of the home through the bottom inlet 34 up one side of the vertically stacked heat storage modules 10 and down around the remaining heat storage modules 10. The interior air is drawn by the fan through the outlet 36 to the rest of the home's air conditioning ductwork.

While a particular embodiment of this invention has been shown and described above, it is obvious that changes and modifications can be made without departing from the true spirit and scope of the invention. It is the intention of the appended claims to cover all such changes and modifications.

I claim:

1. A solar energy storage module for use in a solar energy heat storage and transfer system for storing thermal energy gathered by a solar collector and transferring the stored thermal energy to an air distribution system comprising:
    a sheet of thermally conductive material forming as open-ended, elongated conduit for connection in fluid communication with the solar collector;
    a plurality of elongated heat storage elements received within said conduit, each heat storage element including a sealed tube containing heat of fusion material for storing heat from air circulated through said conduit;
    a plurality of stacked trays retaining said tubes in spaced relation to allow air from the collector to flow along the length of said tubes and trays, each tray having a thermally conductive side portion disposed in surface engagement with one or more of said tubes to promote the transfer of heat from said tubes to siad trays and to said conduit; and,
    end coverings fitted over the open ends of said conduit, said end covers having inlet and outlet openings, respectively, for admitting and discharging air circulated from the solar collector through said conduit along the length of said tubes.

2. The solar energy module of claim 1, wherein said tubes and said conduit have a rectangular cross-sectional area.

3. The solar energy module of claim 1, wherein supporting straps surround said arrangement of stacked trays, retaining said tubes and said trays in alignment.

4. The solar energy storage module of claim 1, wherein said heat of fusion material is a salt-hydrate.

5. The solar energy storage module of claim 4, wherein said salt hydrate is a eutectic mixture.

6. The solar energy module of claim 1, wherein said sheet of thermally conductive material is a sheet of aluminum.

7. The solar energy storage module of claim 1, wherein said sealed tubes and said end covers are formed from a plastic material.

* * * * *